US008966221B2

(12) United States Patent  
Gaertner et al.

(10) Patent No.: US 8,966,221 B2
(45) Date of Patent: Feb. 24, 2015

(54) TRANSLATING TRANSLATION REQUESTS HAVING ASSOCIATED PRIORITIES

(75) Inventors: Ute Gaertner, Schoenaich (DE); Thomas Koehler, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 905 days.

(21) Appl. No.: 13/165,013

(22) Filed: Jun. 21, 2011

(65) Prior Publication Data

US 2011/0320761 A1   Dec. 29, 2011

(30) Foreign Application Priority Data

Jun. 25, 2010   (EP) .................................... 10167272

(51) Int. Cl.
*G06F 12/00* (2006.01)
*G06F 13/00* (2006.01)
*G06F 12/10* (2006.01)
*G06F 12/08* (2006.01)

(52) U.S. Cl.
CPC ........ G06F 12/1027 (2013.01); G06F 12/0855 (2013.01)
USPC ................... 711/207; 711/205; 711/E12.043; 711/E12.049

(58) Field of Classification Search
None
See application file for complete search history.

(56) References Cited

U.S. PATENT DOCUMENTS

| 5,613,083 | A  | * | 3/1997  | Glew et al. ..................... 711/207 |
| 5,983,309 | A  | * | 11/1999 | Atsatt et al. ........................ 711/4 |
| 6,418,522 | B1 |   | 7/2002  | Gaertner et al. |
| 7,024,536 | B2 |   | 4/2006  | Park et al. |
| 7,350,053 | B1 |   | 3/2008  | Sugumar et al. |
| 7,480,769 | B2 |   | 1/2009  | Diefendorff et al. |
| 7,644,252 | B2 |   | 1/2010  | Kawaguchi |
| 7,660,965 | B2 |   | 2/2010  | Hinojosa et al. |
| 7,685,355 | B2 |   | 3/2010  | Bond |
| 2003/0037217 | A1 | * | 2/2003  | Middleton et al. ............ 711/205 |
| 2007/0180156 | A1 |   | 8/2007  | Irish et al. |
| 2007/0180157 | A1 | * | 8/2007  | Irish et al. ......................... 710/5 |
| 2007/0283121 | A1 |   | 12/2007 | Irish et al. |

(Continued)

FOREIGN PATENT DOCUMENTS

WO   WO2009142631 A1   11/2009

OTHER PUBLICATIONS

International Search Report and Written Opinion for PCT/EP2011/058100 dated Sep. 2, 2011.

*Primary Examiner* — Sean D Rossiter
(74) *Attorney, Agent, or Firm* — Steven Chiu, Esq.; Blanche E. Schiller, Esq.; Heslin Rothenberg Farley & Mesiti P.C.

(57) ABSTRACT

A lookup operation is performed in a translation look aside buffer based on a first translation request as current translation request, wherein a respective absolute address is returned to a corresponding requestor for the first translation request as translation result in case of a hit. A translation engine is activated to perform at least one translation table fetch in case the current translation request does not hit an entry in the translation look aside buffer, wherein the translation engine is idle waiting for the at least one translation table fetch to return data, reporting the idle state of the translation engine as lookup under miss condition and accepting a currently pending translation request as second translation request, wherein a lookup under miss sequence is performed in the translation look aside buffer based on said second translation request.

20 Claims, 4 Drawing Sheets

(56) References Cited

U.S. PATENT DOCUMENTS

| | | |
|---|---|---|
| 2008/0065855 A1* | 3/2008 | King et al. .................... 711/207 |
| 2008/0282055 A1 | 11/2008 | Yang |
| 2009/0043985 A1 | 2/2009 | Tuuk et al. |
| 2009/0187695 A1* | 7/2009 | Irish et al. ........................ 711/3 |
| 2009/0187731 A1 | 7/2009 | Deutschle et al. |
| 2010/0106921 A1 | 4/2010 | Glasco et al. |
| 2011/0320761 A1* | 12/2011 | Gaertner et al. ............. 711/206 |
| 2012/0254882 A1* | 10/2012 | Makljenovic et al. ........ 718/103 |
| 2013/0305255 A1* | 11/2013 | Makljenovic et al. ........ 718/103 |
| 2013/0346698 A1* | 12/2013 | Waugh et al. ................ 711/125 |

* cited by examiner

TRANSLATING TRANSLATION REQUESTS HAVING ASSOCIATED PRIORITIES

PRIOR FOREIGN APPLICATION

This application claims priority from European patent application number 10167272.3, filed Jun. 25, 2010, which is hereby incorporated herein by reference in its entirety.

BACKGROUND

One or more aspects of the present invention relate in general to the field of hardware and system software of computer systems, and in particular to a method for address translation and a corresponding address translation unit. Still more particularly, one or more aspects of the present invention relate to a data processing program and a computer program product for address translation.

In today's computer systems like a zGryphon processor core an address translation unit is assigned for translating virtual addresses (VA) to absolute addresses (AA) by means of multiple levels of translation tables as defined in the z/Architecture, for example. The address translation unit receives address translation requests from a Load Store Unit (LSU), a Coprocessor (CoP) for data compression and cryptography, and/or an Instruction Fetch Unit (IFU), for example, wherein the LSU has the highest priority and the IFU has the lowest priority.

In the address translation unit a translation request with the highest priority is gated through an input multiplexer into a current request register. Every translation request comes along with a virtual address (VA), an Address Space Control Element (ASCE) and some additional qualifiers. The ASCE designates the starting address of the highest level translation table involved in this request. As soon as the current request register has been loaded, a lookup operation of a translation look aside buffer as fast address translation is performed, and in case of a hit, the respective absolute address (AA) is gated through a result multiplexer and returned to a corresponding requestor as translation result.

If the translation look aside buffer lookup does not hit, the respective VA is to be translated by a translation engine using means of translation tables residing in an absolute storage region. The translation engine therefore has an interface for translation table fetches. Several table fetches may be required to complete a single translation request and the result is finally returned to the requestor via the result multiplexer and is also stored into the translation look aside buffer, to become available for a lookup hit by subsequent translation requests.

In case a translation request does not hit in the translation look aside buffer, the translation table fetches to be performed by the translation engine may consume about 10 to 1000 cycles, dependent in which level of the cache hierarchy the required entry currently resides. During these table fetches, the translation engine is completely idle; while another translation request may still be waiting for accept.

In the U.S. Pat. No. 6,418,522 B1 "TRANSLATION LOOK ASIDE BUFFER FOR VIRTUAL MEMORY SYSTEMS" by Gaertner et al., which is hereby incorporated herein by reference it its entirety, a translation look aside buffer arrangement is disclosed.

The disclosed translation look aside buffer arrangement uses two buffers, a small first level translation look aside buffer and a larger second level translation look aside buffer. The second level translation look aside buffer feeds address information to the first level translation look aside buffer when the desired virtual address is not contained in the first level translation look aside buffer. Further the second level translation look aside buffer is structured to comprise two n-way set associative sub-units of which one, a higher level unit, covers some higher level address translation levels and the other one, a lower level unit, covers some lower level translation level. Additionally some address information holds some number of middle level virtual address bits, i.e. 8 bits, for example, being able to serve as an index address covering the address range of the higher level sub-unit. Thus, the same information is used as tag information in the lower level sub-unit and is used herein as a quick reference in any lookup operation in order to find the absolute address of the concerned virtual address. Further, the commonly used status bits, like, e.g., valid bits, are used in both translation look aside buffer structures, too.

In the Patent Application Publication US 2009/0187731 A1 "METHOD FOR ADDRESS TRANSLATION IN VIRTUAL MACHINES" by Deutschle et al., which is hereby incorporated herein by reference in its entirety, a method for address translation in a system running multiple levels of virtual machines is disclosed.

The virtual machines are containing a hierarchically organized translation look aside buffer comprising at least two linked hierarchical sub-units, a first sub-unit comprising a translation look aside buffer for some higher level address translation levels, and the second sub-unit comprising a translation look aside buffer for some lower level address translation levels, and the second sub-unit being arranged to store translation look aside buffer index address information of the upper level sub-unit as tag information in its lower level translation look aside buffer structure, comprising the steps of collecting intermediate address translation results on different virtual machine levels, and buffering the intermediate translation results in the translation look aside buffer.

BRIEF SUMMARY

One technical problem underlying an aspect of the present invention is to provide a method for address translation and an address translation unit, which are able to solve the above mentioned shortcomings and pain points of prior art address translation, and to provide a data processing program and a computer program product to perform the method for address translation.

According to one or more aspects of the present invention this problem is solved by providing a method for address translation, an address translation unit, a data processing program for performing the method for address translation, and/or a computer program product causing a computer to perform the method for address translation.

Accordingly, in an embodiment of one or more aspects of the present invention a method for address translation in a system with a address translation unit containing a translation engine configured to perform a translation table fetch and a translation look aside buffer configured to perform a lookup operation for fast address translation, comprises performing the lookup operation in the translation look aside buffer based on a first translation request as current translation request, wherein a respective absolute address is returned to a corresponding requestor for the first translation request as translation result in case of a hit; activating the translation engine to perform at least one translation table fetch in case the current translation request does not hit an entry in the translation look aside buffer; wherein the translation engine is idle waiting for the at least one translation table fetch to return data, reporting the idle state of the translation engine as lookup under miss condition and accepting a currently pending translation request as second translation request, wherein a lookup under miss sequence is performed in the translation look aside buffer based on the second translation request.

In another embodiment of one or more aspects of the present invention, an address translation unit for use in a system running multiple levels of virtual machines comprises a translation engine configured to perform a translation table fetch and a translation look aside buffer configured to perform a lookup operation for fast address translation, wherein the translation look aside buffer is performing a lookup operation based on a first translation request as current translation request and returns a respective absolute address to a corresponding requestor for the first translation request as translation result in case of a hit; wherein the translation engine performs at least one translation table fetch in case the current translation request does not hit an entry in the translation look aside buffer; wherein the translation engine is idle waiting for the at least one translation table fetch to return data, and reporting the idle state as lookup under miss condition, and wherein a currently pending translation request is accepted as second translation request and the translation look aside buffer is performing a lookup under miss sequence based on the second translation request.

In another embodiment of one or more aspects of the present invention, a data processing program for execution in a data processing system comprises software code portions for performing a method for address translation when the program is run on the data processing system.

In yet another embodiment of one or more aspects of the present invention, a computer program product stored on a computer-usable medium, comprises computer-readable program means for causing a computer to perform a method for address translation when the program is run on the computer.

The above, as well as additional purposes, features, and advantages of one or more aspects of the present invention will become apparent in the following detailed written description.

BRIEF DESCRIPTION OF THE SEVERAL VIEWS OF THE DRAWINGS

One embodiment of the present invention, as described in detail below, is shown in the drawings, in which.

DETAILED DESCRIPTION

Figure 1:
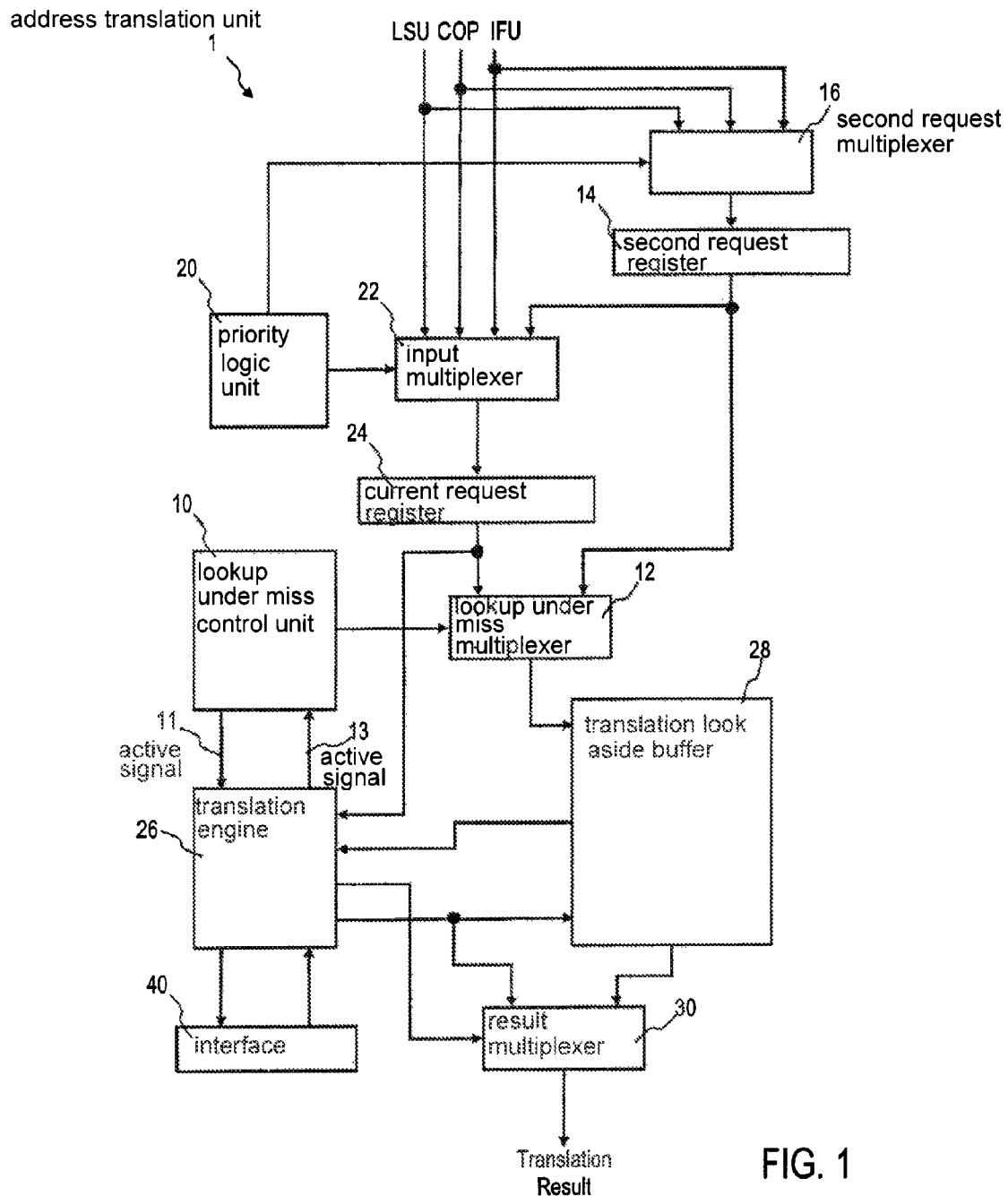
FIG. 1 is one example of a schematic block diagram of an address translation unit, in accordance with an embodiment of the present invention.

Embodiments of one or more aspects of the present invention perform a lookup for a second translation request currently waiting for accept, while another request, which has missed the lookup operation of the translation look aside buffer, is being processed and is just waiting for a table fetch to return data. In the following this translation look aside buffer lookup is called "lookup under miss sequence". Since the translation engine is idle during table fetches, dataflow may be switched over to the second translation request without the risk of corrupting the current translation request.

One aspect of the present invention is to receive and accept a second translation request and keep it in a dedicated register, while the current translation request, which has missed the lookup operation in the translation look aside buffer, is still being processed and the translation engine is idle waiting for a table fetch for the current request to return data.

Embodiments of one or more aspects of the present invention may perform the lookup under miss sequence in the translation look aside buffer for second translation requests only, when a currently processed translation request has a lower priority. For example, the lookup under miss sequence is only performed for LSU requests under lookup operation misses in the translation look aside buffer for IFU translation requests or CoP translation requests as current translation requests. This limitation is due to a specific cost-benefit analysis; while in general, lookup under miss may be performed for any request under any miss.

Embodiments of one or more aspects of the present invention accept a second request immediately instead of waiting until the current request has completed before accepting the second request. So, in case of a hit in the lookup under miss sequence in the translation look aside buffer, the second request can be completed without waiting for the current request to complete. Even a further pending translation request may be accepted as second request again and be treated the same way. In case of a miss in the lookup under miss sequence in the translation look aside buffer however, the second request remains active and is treated as priority request, being processed regularly as soon as the current request has completed.

There is one possible complication about this concept, in case the table fetch completes just while the lookup under miss sequence is in progress. This would cause the translation engine to leave the idle state and to continue processing and possibly to return a translation result to the corresponding requestor in the same cycle, as the lookup under miss result is going to be sent to the corresponding requestor, both using the same dataflow elements as e.g. result multiplexer. To avoid this type of collision, the translation engine is to be aware of a lookup under miss sequence in progress. When a table fetch returns data while a lookup under miss sequence is in progress, the "done" indication for the table fetch gets delayed inside the translation engine until this sequence has completed. This causes the translation engine to remain in idle state during that time and avoid potential collisions. The table fetch data remains valid and therefore no additional register is required to hold it. As soon as the lookup under miss sequence has completed, the internal done signal of the table fetch operation is released and causes the current request to continue and finally to be completed as usual. Alternatively the lookup under miss sequence may be delayed and the table fetch result may be sent first. But this solution has the drawback that additional delay circuits are needed in the translation look aside buffer.

FIG. 1 shows an address translation unit 1, in accordance with an embodiment of the present invention for use in a system running multiple levels of virtual machines.

Referring to FIG. 1 the shown embodiment of one or more aspects of the present invention employs an address translation unit 1 assigned for translating virtual addresses (VA) to absolute addresses (AA) by means of multiple levels of translation tables. The address translation unit 1 receives address translation requests from a Load Store Unit (LSU), a CoProcessor (CoP) for data compression and cryptography and/or an Instruction Fetch Unit (IFU), for example, wherein the LSU has the highest priority and the IFU has the lowest priority.

In the address translation unit 1 a priority logic unit 20 gates a translation request with the highest priority through an input multiplexer 22 into a current request register 24. Every translation request, in one embodiment, comes along with a virtual address (VA), an Address Space Control Element (ASCE) and some additional qualifiers. The ASCE designates the starting address of the highest level translation table involved in this request. As soon as the current request register 24 has been loaded, a lookup operation of a translation look aside buffer 28 as fast address translation is performed, and in case of a hit, the respective absolute address (AA) is gated through a result multiplexer 30 and returned to a corresponding requestor LSU, COP, IFU as translation result.

If the lookup in the translation look aside buffer 28 does not hit an entry, the respective virtual address (VA) needs to be translated by a translation engine 26 using means of translation tables residing in an absolute storage region. The translation engine 26 therefore has an interface 40 for translation table fetches. Several table fetches may be required to complete a single translation request and the result is finally returned to the corresponding requestor LSU, COP, IFU via the result multiplexer 30 and is also stored into the translation look aside buffer 28, to become available for a lookup hit by subsequent translation requests. During the at least one translation table fetch the translation engine 26 is idle waiting for the at least one translation table fetch to return data.

Figure 2:
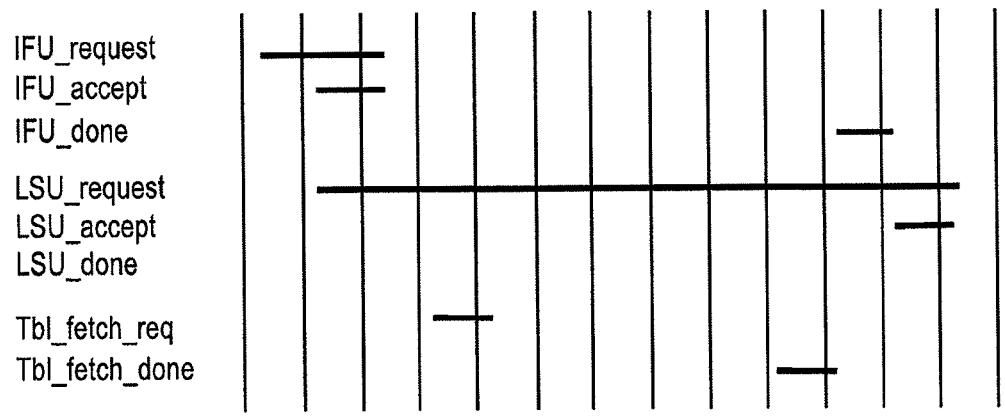
FIG. 2 is one example of a timing diagram of prior art address translation unit.

In a "Prior Art Timing" shown in FIG. 2, multiple requests, e.g. an IFU translation request IFU_request directly followed by a translation request LSU_request of the LSU, are processed sequentially. The IFU translation request IFU_request gets accepted, shown in FIG. 2 as IFU_accept, and starts to be processed immediately. Since in the present example the IFU translation request IFU_request does not hit an entry in the translation look aside buffer 28 during the lookup operation, it requires table fetches to be performed by the translation engine 26. The present example shows only a single table fetch, but also a multiple of table fetches may be performed, consuming a substantial amount of time, represented in FIG. 2 as Tbl_fetch_req and Tbl_fetch_done. Since the translation engine 26 is idle at that point in time, the LSU translation request LSU_request cannot be accepted and processed, although it has higher priority, as long as the IFU translation request IFU_request has not completed. So the LSU_request is finally accepted, shown in FIG. 2 as LSU_accept, and could be processed after the IFU translation request IFU_request is completed, shown in FIG. 2 as IFU_done.

According to one or more aspects of the present invention the idle state of the translation engine 26 (FIG. 1) is reported as lookup under miss condition using a table fetch active signal 13, and a currently pending translation request is accepted as second translation request and said translation look aside buffer 28 is performing a "lookup under miss sequence" based on the second translation request. The activity of the lookup under miss sequence is reported to the translation engine 26 using a lookup under miss active signal 11.

Figure 3:
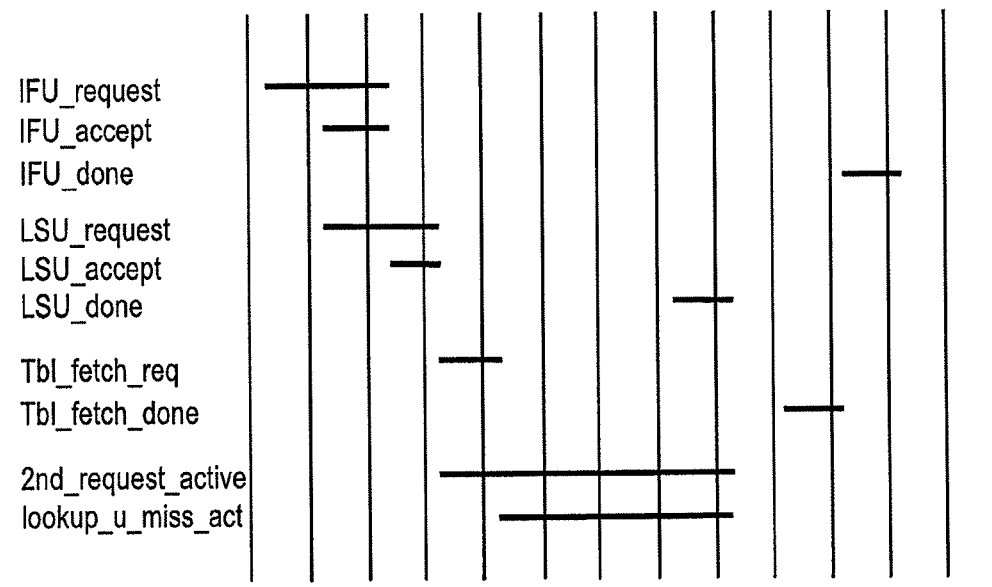
FIG. 3 is one example of a timing diagram of an address translation unit, in accordance with an embodiment of the present invention.

In accordance with embodiments of one or more aspects of the present invention, new dataflow elements are added. In the shown embodiment of one or more aspects of the present invention one second request register 14 for receiving and holding second translation request information related to the respective second translation request is used. Instead of waiting until the current translation request, shown in FIG. 3 as IFU_request, which has been accepted, shown in FIG. 3 as IFU_ac-cept, and has started to be processed immediately, has completed before accepting the second translation request, shown in FIG. 3 as LSU_request, the second translation request LSU_request gets now immediately accepted, shown in the timing diagram of FIG. 3 as LSU_accept, and is written to a second request register 14. As soon as the lookup under miss control unit 10 detects a table fetch being active in the translation engine 26, shown in FIG. 3 as Tbl_fetch_req and Tbl_fetch_done, it switches a lookup under miss multiplexer 12 gating the second translation request information LSU_request from the second request register 14 to the translation look aside buffer 28 and starts a four cycle lookup under miss sequence as shown in the timing diagram of FIG. 3 as 2nd_request_active and lookup_u_miss_act. During these four cycles dataflow is switched from the second request register 14 to the translation look aside buffer 28 for the lookup under miss sequence. In the shown embodiment of an aspect of the present invention during a second cycle the translation look aside buffer 28 is accessed and a part of the hit compare is performed. During a third cycle remaining part of the hit compare is performed and during a fourth cycle in case of hit a lookup result is returned to the requestor LSU, COP, IFU, here the LSU, and the lookup under miss indication is reset and the dataflow is switched back to the current request, as shown in FIG. 3 as LSU_done. In case of miss, the dataflow is just switched back and the lookup under miss indication is kept active. After completion of the second request LSU_request the table fetch returns a result, shown as Tbl_fetch_done in FIG. 3, which is returned to the requestor LSU, COP, IFU, here the IFU, and the table fetch indication is reset, as shown in FIG. 3 as IFU_done. So instead of processing multiple requests sequentially like prior art solutions, embodiments of one or more aspects of the present invention are processing multiple requests partly parallel, if a table fetch process is needed to perform a current translation request.

So in case of a hit in the lookup under miss sequence in the translation look aside buffer 28 the second request can be completed without waiting for the current request to complete. Even another translation request may be accepted as second request again and be treated the same way.

However, in case of a miss in the lookup under miss sequence in the translation look aside buffer 28, the second request remains active in the second request register 14, and is treated as highest priority request, being processed regularly as soon as the current request has completed.

In embodiments of one or more aspects of the present invention the first translation request and/or the second translation request may be sent by one or more requestors LSU, COP, IFU. So at least one tag bit is added to each translation request to handle an out of order result return so that a translation result is sent to a corresponding requestor LSU, COP, IFU, which is able to assign a received translation result to the correct translation request based on the at least one tag bit.

Additionally in the shown embodiment in case of more than one pending translation requests the priority logic 20 is gating a pending translation request with highest priority as second request to the second request register 14 by using second request multiplexer 16.

There is one possible complication about this concept, in case the table fetch completes just while the lookup under miss sequence is in progress. This would cause the translation engine 26 to leave the idle state and to continue processing and possibly to return a translation result to the corresponding requestor LSU, COP, IFU of the current translation request in the same cycle, as the lookup under miss result is going to be sent to the requestor LSU, COP, IFU of the second translation request, both using the same dataflow elements as e.g. the result multiplexer 30. To avoid this type of collision, the translation engine 26 is to be aware of a lookup under miss sequence in progress (see respective signal 11 in block diagram). When a table fetch returns data while a lookup under miss sequence is in progress, the done indication for the table fetch gets delayed inside the translation engine 26 until the lookup under miss sequence has completed. This causes the translation engine 26 to remain in idle state during that time and avoids potential collisions. The table fetch data remain valid and therefore no additional register is required to hold it. As soon as the lookup under miss sequence has completed, the internal done signal of the table fetch operation is released and causes the current request to continue and finally be completed as usual.

In alternative embodiments of one or more aspects of the present invention, not shown, a plurality of second request registers 14 is used to store more than one pending translation request as second translation request, wherein the number of storable second translation requests is limited by the number of second request registers 14. A further priority logic may be used to manage a processing order and/or a result return order of the more than one second translation request and/or a rerouting of a processed second translation request to the input multiplexer 22 in case of a miss. In this case the translation look aside buffer 28 returns a respective absolute address to a corresponding requestor LSU, COP, IFU for the second translation request as translation result of the lookup under miss sequence in case of a hit and reports completion of the lookup under miss sequence, or stops the lookup under miss sequence and reports the stop of the lookup under miss sequence in case of a miss, wherein a further currently pending translation request is accepted and processed as second translation request in case the current second translation request is completed or stopped and the translation engine 26 is still performing the at least one translation table fetch based on the current translation request. The current second translation request is treated as priority request rerouted to the input multiplexer 22 and being processed as regular translation request as soon as processing of the current request is completed.

Figure 4:
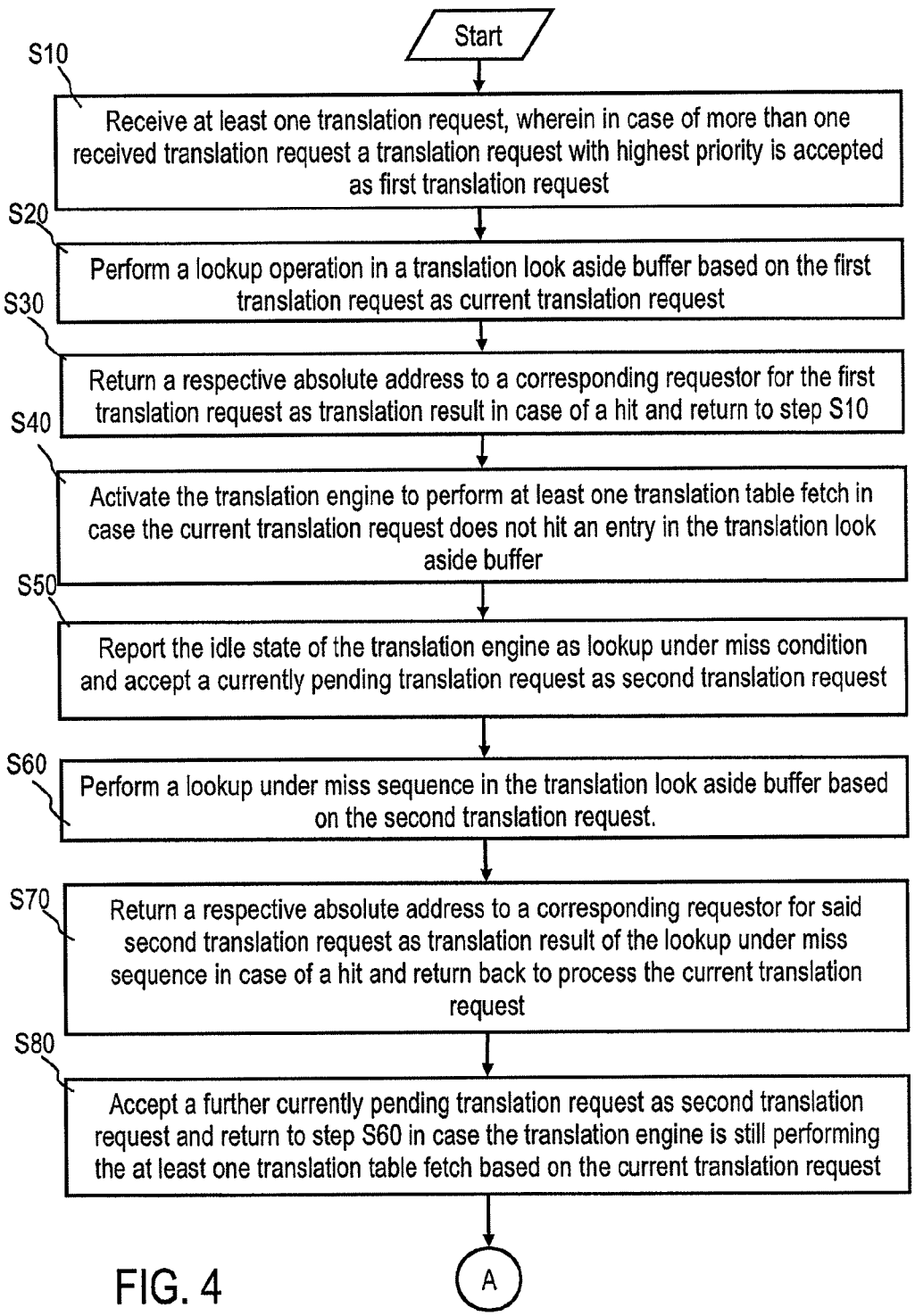
FIGS. 4 and 5 are an embodiment of a schematic process flow of a method for address translation, in accordance with an embodiment of the present invention.
Figure 5:
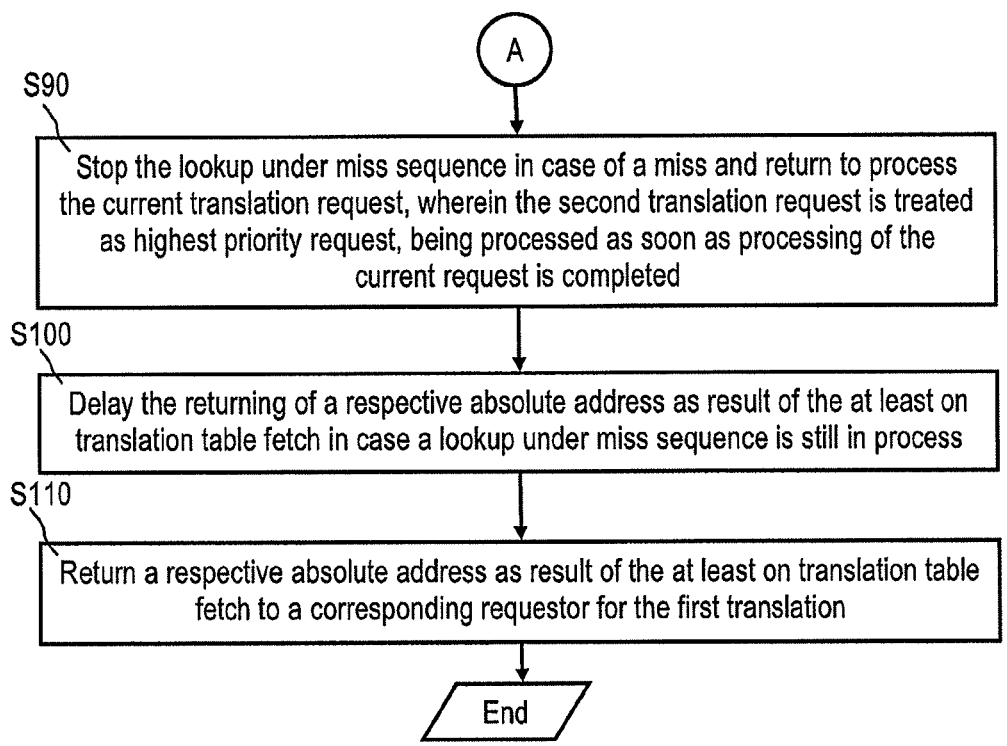

FIGS. 4 and 5 show one example of a schematic process flow of a method for address translation in a system with an address translation unit 1 containing a translation engine 26 configured to perform a translation table fetch and a translation look aside buffer 28 configured to perform a lookup operation for fast address translation, wherein FIG. 4 shows a first part of the process flow and FIG. 5 shows a second part of the process flow.

Referring to FIGS. 4 and 5 a method for address translation of the shown embodiment of an aspect of the present invention receives at least one translation request in step S10, wherein in case of more than one received translation request a translation request with highest priority is accepted as first translation request. In step S20 a lookup operation in the translation look aside buffer 28 based on the first translation request as current translation request is performed. In step S30 a respective absolute address is returned to a corresponding requestor LSU, COP, IFU for the first translation request as translation result in case of a hit and the method returns to step S10. In case the current translation request does not hit an entry in the translation look aside buffer the translation engine 26 is activated in step S40 to perform at least one translation table fetch. In step S50 the idle state of the translation engine 26 is reported as lookup under miss condition and a currently pending translation request is accepted as second translation request. During step S60 a lookup under miss sequence is performed in the translation look aside buffer 28 based on the second translation request. In step S70 a respective absolute address is returned to a corresponding requestor LSU, COP, IFU for the second translation request as translation result of the lookup under miss sequence in case of a hit and the method returns back to process the current translation request.

In case the translation engine is still performing the at least one translation table fetch based on the current translation request a further currently pending translation request is accepted as second translation request in step S80 and the method returns to step S60.

In case of a miss the lookup under miss sequence is stopped in step S90 (FIG. 5) and the method returns back to process the current translation request, wherein the second translation request is treated as highest priority request, being processed as soon as processing of the current request is completed.

In case a lookup under miss sequence is still in process the returning of a respective absolute address as result of the at least one translation table fetch is delayed in step S100 until the lookup under miss sequence completes. In step S110 a respective absolute address is returned as result of the at least one translation table fetch to a corresponding requestor LSU, COP, IFU for the first translation.

The method for address translation is described for an embodiment of the invention, where just one second request register 14 is used and only one pending translation request at a time is accepted and processed as second translation request. If more than one pending translation request should be accepted and processed as second translation requests a corresponding number of second request registers 14 is used. Also additional method steps are used to manage a processing order and/or a result return order of the more than one second translation request and/or a rerouting of a processed second translation request to the input multiplexer 22 in case of a miss.

In further embodiments of one or more aspects of the present invention, in case of a hit the lookup under miss sequence returns a respective absolute address to a corresponding requestor for the second translation request as translation result and the method returns back to process the current translation request.

In further embodiments of one or more aspects of the present invention, in case of a miss the lookup under miss sequence is stopped and the method returns to process the current translation request, wherein the second translation request is treated as priority request, being processed as soon as processing of the current request is completed.

In further embodiments of one or more aspects of the present invention, a further currently pending translation request is accepted and processed as second translation request in case the current second translation request is completed or stopped and the translation engine is still performing the at least one translation table fetch based on the current translation request.

In further embodiments of one or more aspects of the present invention, in case the at least one translation table fetch is completed while the lookup under miss sequence is in process a result of the at least one translation table fetch is delayed until the lookup under miss sequence is completed.

In further embodiments of one or more aspects of the present invention, in case the at least one translation table fetch is completed while the lookup under miss sequence is in process a result of the lookup under miss sequence is delayed until the result of the at least one translation table fetch is returned to the corresponding requestor for the current translation request as translation result.

In further embodiments of one or more aspects of the present invention, each translation request comprises at least one tag bit to handle an out of order result return so that a translation result is sent to a corresponding requestor, wherein the first translation request and/or the second translation request are sent by one or more requestors.

In further embodiments of one or more aspects of the present invention, in case of more than one received translation requests priority logic unit is gating a translation request with highest priority as current request to a current request register by using an input multiplexer.

In further embodiments of one or more aspects of the present invention, the second translation request is written to a second request register.

In further embodiments of one or more aspects of the present invention, in case of more than one pending translation requests the priority logic unit is gating a pending translation request with highest priority as second request to the second request register.

In further embodiments of one or more aspects of the present invention, the translation requests are received from a Load Store Unit (LSU) and/or a Coprocessor (COP) and/or an Instruction Fetch Unit (IFU).

In further embodiments of one or more aspects of the present invention, a lookup under miss control unit is gating the second translation request stored in the second request register to the translation look aside buffer by using a lookup under miss multiplexer.

In further embodiments of one or more aspects of the present invention, a plurality of second request registers is used to store more than one pending translation request as second translation request, wherein a further priority logic is used to manage a processing order and/or a result return order of the more than one second translation request and/or a rerouting of a stopped second translation request to the input multiplexer in case of a miss.

In further embodiments of one or more aspects of the present invention, the translation look aside buffer returns a respective absolute address to a corresponding requestor for the second translation request as translation result of the lookup under miss sequence in case of a hit and reports completion of the lookup under miss sequence, or stops the lookup under miss sequence and reports the stop of the lookup under miss sequence in case of a miss, wherein a further currently pending translation request is accepted and processed as second translation request in case the current second translation request is completed or stopped and the translation engine is still performing the at least one translation table fetch based on the current translation request, wherein the current second translation request is treated as priority request and is rerouted to the input multiplexer and is being processed as soon as processing of the current request is completed.

One or more aspects of the present invention for address translation can be implemented as an entirely software embodiment, or an embodiment containing both hardware and software elements. In one embodiment, the present invention is implemented in software, which includes but is not limited to firmware, resident software, microcode, etc.

Furthermore, one or more aspects of the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method for address translation in a system with an address translation unit including a translation engine configured to perform a translation table fetch and a translation look aside buffer configured to perform a lookup operation for fast address translation, wherein the method comprises:

obtaining, by the address translation unit, a plurality of translation requests and designating a first translation request of the plurality of translation requests as a current translation request, wherein the first translation request has a first associated priority, and wherein the designating is based on the first associated priority;

performing a first lookup operation in the translation look aside buffer based on the current translation request;

based on the lookup operation of the current translation request in the translation look aside buffer hitting an entry, returning a respective absolute address to a corresponding requestor for the first translation request as a translation result;

based on the lookup operation of the current translation request in the translation look aside buffer not hitting an entry, activating the translation engine and performing at least one translation table fetch, wherein the translation engine is idle waiting for the at least one translation table fetch to return data; and reporting the idle state of the translation engine as lookup under miss condition to the address translation unit and based on the reporting, performing a lookup under miss sequence, comprising:

the translation look aside buffer accepting a second translation request from the plurality of translation requests, wherein the second translation request has a second associated priority, and wherein the accepting is based on the second associated priority; and concurrent to the translation engine waiting for the at least one translation table fetch to return data, performing a second lookup operation in the translation look aside buffer based on the second translation request.

2. The method of claim 1, wherein in case of a hit said lookup under miss sequence returns a respective absolute address to a corresponding requestor for said second translation request as a second translation result and said method returns back to process said current translation request.

3. The method of claim 1, further comprising:
completing or stopping the second translation request concurrent to the translation engine waiting for the at least one translation table fetch to return data;
based on the completing or stopping, designating a third translation request of the plurality of translation requests; and
performing a third lookup operation in the translation look aside buffer based on the third translation request.

4. The method of claim 1, further comprising:
stopping the lookup under miss sequence and completing processing the current translation request and based on completing the processing of the current translation request, processing the second translation request.

5. The method of claim 1, further comprising:
completing or stopping the second translation request concurrent to the translation engine waiting for the at least one translation table fetch to return data;
based on the completing or stopping and the translation engine waiting for the at least one translation table fetch to return data, designating a third translation request of the plurality of translation requests;
performing a third lookup operation in the translation look aside buffer based on the third translation request; and
returning a respective absolute address to a corresponding requestor for the third translation request as a third translation result before completing the first translation request.

6. The method of claim 1, wherein in case said at least one translation table fetch is completed while said lookup under miss sequence is in process a result of said at least one translation table fetch is delayed until said lookup under miss sequence is completed.

7. The method of claim 1, wherein in case said at least one translation table fetch is completed while said lookup under miss sequence is in process a result of said lookup under miss sequence is delayed until said result of said at least one translation table fetch is returned to said corresponding requestor for said current translation request as a translation result.

8. The method of claim 1, wherein each translation request comprises at least one tag bit to handle an out of order result return so that a translation result is sent to a corresponding requestor, wherein at least one of said first translation request or said second translation request is sent by one or more requestors.

9. An address translation unit for use in a system running multiple levels of virtual machines, said address translation unit comprising:
a translation engine configured to perform a translation table fetch; and
a translation look aside buffer configured to perform a lookup operation for fast address translation, wherein the address translation unit is configured to perform a method comprising:
obtaining, by the address translation unit, a plurality of translation requests and designating a first translation request of the plurality of translation requests as a current translation request, wherein the first translation request has a first associated priority, and wherein the designating is based on the first associated priority;
performing a first lookup operation in the translation look aside buffer based on the current translation request;
based on the lookup operation of the current translation request in the translation look aside buffer hitting an entry, returning a respective absolute address to a corresponding requestor for the first translation request as a translation result;
based on the lookup operation of the current translation request in the translation look aside buffer not hitting an entry, activating the translation engine and performing at least one translation table, wherein the translation engine is idle waiting for the at least one translation table fetch to return data; and
reporting the idle state of the translation engine as lookup under miss condition to the address translation unit and based on the reporting, performing a lookup under miss sequence, comprising:
the translation look aside buffer accepting a second translation request form the plurality of translation requests wherein the second translation request has a second associated priority, and wherein the accepting is based on the second associated priority; and
concurrent to the translation engine waiting for the at least one translation table fetch to return data, performing a second lookup operation in the translation look aside buffer based on the second translation request.

10. The address translation unit of claim 9, wherein the address translation unit further comprises a priority logic unit to gate the current request to a current request register by using an input multiplexer.

11. The address translation unit of claim 10, wherein said second translation request is written to a second request register.

12. The address translation unit of claim 11, wherein said priority logic unit is configured to gate the second request to said second request register.

13. The address translation unit of claim 11, further comprising a lookup under miss control unit configured to gate said second translation request stored in said second request register to said translation look aside buffer by using a lookup under miss multiplexer.

14. The address translation unit of claim 13, wherein a plurality of second request registers is used to store more than one translation request of the plurality of translation requests, wherein a further priority logic is used to manage at least one of: a processing order or a result return order of said plurality of translation requests or a rerouting of a stopped translation request of the plurality of translation requests to said input multiplexer in case of a miss.

15. The address translation unit of claim 14, the method further comprising:
based on the lookup operation of the second translation request in the translation look aside buffer hitting an entry, returning, by the translation look aside buffer, a respective absolute address to a corresponding requestor for the second translation request as a translation result of the lookup under miss sequence;
based on the lookup operation of the second translation request in the translation look aside buffer not hitting an entry, stopping the lookup under miss sequence and reporting the stopping of the lookup under miss sequence;

based on the stopping or completing the second translation request, concurrent to the translation engine waiting for the at least one translation table fetch to return data, designating a third translation request from the plurality of translation requests, wherein the third translation request has a third associated priority, and performing a third lookup operation in the translation look aside buffer based on the third translation request; and rerouting the second translation request to the input multiplexer and processing the second translation request as soon as processing of the current request is completed.

16. The address translation unit of claim 9, wherein the plurality of translation requests are received from at least one of a Load Store Unit (LSU), a Coprocessor (COP), or an Instruction Fetch Unit (IFU).

17. A computer program product for address translation in a system with an address translation unit including a translation engine configured to perform a translation table fetch and a translation look aside buffer configured to perform a lookup operation for fast address translation, wherein said computer program product comprises:

a non-transitory computer readable storage medium readable by a processing circuit and storing instructions for execution by the processing circuit for performing a method comprising:

obtaining, by the address translation unit, a plurality of translation requests and designating a first translation request of the plurality of translation requests as a current translation request, wherein the first translation request has a first associated priority, and wherein the designating is based on the first associated priority;

performing a first lookup operation in the translation look aside buffer based on the current translation request;

based on the lookup operation of the current translation request in the translation look aside buffer hitting an entry, returning a respective absolute address to a corresponding requestor for the first translation request as a translation result;

based on the lookup operation of the current translation request in the translation look aside buffer not hitting an entry, activating the translation engine and performing at least one translation table fetch, wherein the translation engine is idle waiting for the at least one translation table fetch to return data; and reporting the idle state of the translation engine as lookup under miss condition to the address translation unit and based on the reporting, performing a lookup under miss sequence comprising:

the translation look aside buffer accepting a second translation request from the plurality of translation requests, wherein the second translation request has a second associated priority; and concurrent to the translation engine waiting for the at least one translation table fetch to return data, performing a second lookup operation in the translation look aside buffer based on the second translation request.

18. The computer program product of claim 17, the lookup under miss sequence further comprising:

based on the lookup operation of the second translation request in the translation look aside buffer hitting an entry, returning a respective absolute address to a corresponding requestor for the second translation request as a translation result and processing the current translation request.

19. The computer program product of claim 17, the method further comprising:

completing or stopping the second translation request concurrent to the translation engine waiting for the at least one translation table fetch to return data; and based on the completing or stopping, designating a third translation request of the plurality of translation requests; and performing a third lookup operation in the translation look aside buffer based on the third translation request.

20. The computer program product of claim 17, the method further comprising:

stopping the lookup under miss sequence and completing processing the current translation request and based on completing the processing of the current request, processing the second translation request.

* * * * *